United States Patent [19]

Brands

[11] Patent Number: 5,475,059
[45] Date of Patent: Dec. 12, 1995

[54] METHOD OF ACHIEVING SUPERIOR DISPERSIONS OF POLYMERIC SULFUR AND PRODUCTS THEREOF

[75] Inventor: George B. Brands, Wilmette, Ill.

[73] Assignees: Saynad Corporation; The Brands Family Illinois Limited Partnership, both of Wilmette, Ill.; a part interest

[21] Appl. No.: 187,659

[22] Filed: Jan. 25, 1994

Related U.S. Application Data

[63] Continuation-in-part of Ser. No. 993,205, Dec. 18, 1992, abandoned.

[51] Int. Cl.[6] .................................................. C08F 28/02
[52] U.S. Cl. ................................... 525/189; 525/328.8
[58] Field of Search .................................. 525/189, 328.8

[56] References Cited

U.S. PATENT DOCUMENTS

| | | | |
|---|---|---|---|
| 1,782,693 | 11/1930 | Miller | 525/206 |
| 1,859,992 | 5/1932 | Seil | 423/592 |
| 1,875,372 | 9/1932 | Endres | 525/349 |
| 1,992,611 | 2/1935 | Grindrod | 252/6 |
| 2,061,185 | 11/1936 | Ceccon | 23/242 |
| 2,413,714 | 1/1947 | Keeling | 23/225 |
| 2,419,309 | 4/1947 | Belchetz | 23/224 |
| 2,419,310 | 4/1947 | Belchetz | 23/224 |
| 2,419,324 | 4/1947 | Missbach | 23/224 |
| 2,460,365 | 2/1949 | Schallis | 23/224 |
| 2,462,146 | 2/1949 | Walcott et al. | 23/224 |
| 2,481,140 | 9/1949 | Morris et al. | 260/139 |
| 2,513,524 | 7/1950 | Schallis | 23/224 |
| 2,534,063 | 12/1950 | Ross et al. | 23/225 |
| 2,569,375 | 9/1951 | Grove | 23/224 |
| 2,582,794 | 1/1952 | Porter et al. | 23/224 |
| 2,608,471 | 8/1952 | Carney | 23/224 |
| 2,667,406 | 1/1954 | Morningstar | 23/224 |
| 2,757,075 | 7/1956 | Haimsohn | 23/224 |
| 2,989,513 | 6/1961 | Hendry et al. | 260/79 |
| 3,259,598 | 7/1966 | Solomon | 260/23 |
| 3,264,239 | 8/1966 | Rosen et al. | 260/23.7 |
| 3,431,214 | 3/1969 | McDonald | 252/189 |
| 3,523,926 | 8/1970 | Mirviss | 260/79 |
| 3,544,492 | 12/1970 | Taylor et al. | 260/4 |
| 3,706,708 | 12/1972 | Kearnan et al. | 260/79.5 |
| 4,238,470 | 12/1980 | Young | 423/567 |
| 4,359,452 | 11/1982 | Shim | 423/567 |
| 4,564,670 | 1/1986 | Kearnan | 528/389 |
| 4,621,118 | 11/1986 | Schloman, Jr. et al. | 525/130 |
| 4,739,036 | 4/1988 | Colvin et al. | 528/389 |
| 4,902,775 | 2/1990 | Colvin et al. | 528/389 |

FOREIGN PATENT DOCUMENTS

| | | |
|---|---|---|
| 646916 | 11/1950 | United Kingdom . |
| 652421 | 4/1951 | United Kingdom . |

OTHER PUBLICATIONS

Natural Rubber Formulary, pp.128–129 and pp. 180–181.
The Blooming of Sulfur and Other Ingredients from Compounded Stocks, Kuzminskii, et al, Rubber Chemistry and Technology 35 (1) pp. 147–152, (1962) translated by R. J. Moseley from "Starenie i Zashchita Resin", Proc. Scientific Research Inst. Rubber Ind. Sb. 6, 84–91; RAPRA translation 892.
Insoluble Sulfur—The Original Tack Preserver, J. E. Kearnan; Paper presented at the 132nd Meeting of the Rubber Division, American Chemical Society, Cleveland, Ohio (USA), Oct. 6–9, 1987.
Tech Service by Michael A. Fath, Elastomer Technology Inc., published in Rubber World, Feb. 1994, pp. 18–22, and 29.
Polymeric Sulfur and Related Polymers, Tobolsky and MacKnight, Interscience Publishers, Div. of John Wiley & Sons, pp. 11–17 and pp. 117–123.
Sulfur, Energy and Environment, Beat Meyer, p, 43 , Elsevier Scientific Publishing Co., 1977.

Primary Examiner—W. Robinson Clark
Attorney, Agent, or Firm—Quarles & Brady

[57] ABSTRACT

A method of achieving a superior dispersion of polymeric sulfur comprises mixing the polymeric sulfur while it is in the rubbery state with a diluent, such as rubber, to obtain a uniform dispersion of the sulfur in the diluent.

4 Claims, No Drawings

5,475,059

METHOD OF ACHIEVING SUPERIOR DISPERSIONS OF POLYMERIC SULFUR AND PRODUCTS THEREOF

RELATED CASE

The present application is a continuation-in-part of my earlier patent application, Ser. No. 07/993,205 filed Dec. 18, 1992, now abandoned.

FIELD OF THE INVENTION

The invention relates generally to sulfur. More particularly, it relates to a method of achieving novel superior dispersions of polymeric sulfur in unvulcanized rubber by adding the polymeric sulfur to the rubber while the polymeric sulfur is in the rubbery state and to the resulting product.

BACKGROUND OF THE INVENTION

Rubber and similar polymers must be mixed with a selection of other ingredients to develop the properties necessary for specific applications. One of these ingredients is a vulcanizing agent. Elemental sulfur is by far the most widely used vulcanizing agent, especially in tires and other dynamic applications. While certain chemical compounds of sulfur can be used as sulfur donors to accomplish vulcanization, only elemental sulfur is believed to impart the optimum combination of properties for most of the tire. One of the most important properties required in tire rubber is fatigue resistance. The superior fatigue resistance achieved when using elemental sulfur instead of sulfur donors is reported in the "Natural Rubber Formulary" pp128–129, and again on pp180–181. Elemental sulfur is used in the rubber industry in two basic forms:

1. Ortho-rhombic (commonly called rhombic) crystals, consisting of molecules containing eight sulfur atoms per molecule in a ring-like structure. This form is referred to as normal, or soluble sulfur. Its main disadvantage is that it "blooms" in the unvulcanized rubber compound.
2. Polymeric sulfur, consisting of molecules that contain long chains of sulfur atoms, usually thousands of sulfur atoms per molecule. At room and processing temperatures, these chains tend to revert to normal sulfur. This reversion can be deterred by adding certain stabilizing agents in small quantities. The stabilized forms have dominated the market. Polymerized sulfur is referred to as insoluble sulfur. There are no known solvents for insoluble sulfur; hence its name. Its main disadvantage is that it is hard to disperse well in the unvulcanized rubber compound. It is also quite expensive compared to normal sulfur.

The degree of dispersion, in the unvulcanized rubber compound, of all of these compounding ingredients affects the properties of the vulcanized product. This is especially true of the vulcanizing agent. For the vast majority of products, such as tires, the best dispersion gives the best product because of the homogeneity achieved. Sulfur exists at room temperatures primarily as rhombic crystals. Other forms of sulfur, such as monoclinic crystalline sulfur, or polymeric sulfur, are the normal primary forms which elemental sulfur assumes at certain higher temperature ranges. At room temperatures, these forms convert, or revert, to rhombic sulfur.

Polymeric sulfur is called insoluble sulfur, especially in the rubber industry, and normal, non-polymeric or rhombic sulfur is called soluble sulfur, because it is soluble to a limited extent in most rubbers. The term "rubber" as used herein means any sulfur vulcanizable polymer. Sulfur vulcanizable polymers are primarily those polymers having carbon to carbon molecular chain structures, with some double bonds existing in their structure. These polymers are called unsaturated. The double bonds are the sites for sulfur vulcanization. The term "rubbery" as used herein means masses of matter that are not hard, brittle, or friable, but are plastic and/or elastic. The term "saturated rubbery polymers" means those rubbery polymers that do not contain sulfur vulcanizable bonds, such as ethylene-propylene rubber.

The amount of normal or rhombic sulfur that is soluble in rubber increases as the temperature increases. Typical rubber compounds contain from one to three parts of sulfur per one hundred parts of rubber hydrocarbon (rhc). The processing of unvulcanized rubber requires mechanical working of the rubber, which generates heat. The temperatures developed as a result of this processing are usually sufficient to dissolve the typical normal sulfur content. When the rubber cools to room temperature the solubility of the sulfur in rubber is exceeded, and a supersaturated solution ensues. This supersaturated portion of the sulfur tends to migrate to the surface of the rubber and crystallize. This condition is called "bloom" and is highly undesirable.

At room temperatures, surface blooming occurs primarily when the concentration of soluble sulfur in the rubber is between the limits of about 0.8 parts and 8.0 parts per 100 parts of rubber hydrocarbon. These limits vary among different compounds. Below the lower limit the sulfur is soluble. Above the upper limit the sulfur drops out of solution in the interior of most rubber compounds, forming micro-crystals throughout the mix. In some rubber compounds these micro-crystals grow to objectionable size, causing nonhomogeneity of properties throughout the vulcanized product.

Polymeric or insoluble sulfur does not dissolve in rubber, and therefore does not bloom. However, the insoluble sulfur can revert to normal sulfur, and the rate of reversion is a time-temperature phenomenon which increases with temperature. Elemental insoluble sulfur can be stabilized by the addition of various substances, notably the halogens. This stabilized insoluble sulfur tends to remain polymeric at room and processing temperatures but it reverts to normal sulfur at the higher vulcanizing temperatures, thus becoming available for the vulcanization reaction.

Insoluble sulfur is normally supplied by the sulfur manufacturers in discrete particles, or powder. This powder is extremely fine, classically having a reported average particle size of 3 microns. These particles are considerably smaller than the particles usually supplied of normal sulfur. These smaller particles are desired because the dispersion of this form of insoluble sulfur is limited by the particle size supplied, unlike the dispersion of soluble sulfur. This very fine powder presents various processing difficulties. It tends to form dust clouds in the mixing room, which are both a health hazard and a safety hazard. Sulfur dust explosions are a known hazard in the rubber industry. A number of ways to reduce this dusting are mentioned in the literature. Also, the sulfur powder is difficult to disperse in rubber. The individual particles tend to agglomerate. Because of this, the powders are frequently mixed with a portion of a polymer or other matrix materials to form a masterbatch before being added to the final compound. These masterbatches usually contain fifty percent or more sulfur. This processing step adds to the cost. Since these discrete particles retain their identity during mixing, the best possible dispersion is limited by the size of the particles, unless their melting point is exceeded. However, when melted, the rate of reversion is very rapid and the reverted sulfur, of course, blooms, and the advantages of using insoluble sulfur are negated.

The prior art falls in three categories:

1. Insoluble sulfur powders

U.S. Patent No. 2,419,310 to Belchetz

U.S. Patent No. 2,419,309 to Belchetz

U.S. Patent No. 2,579,375 to Grove

These patents deal with insoluble sulfur in a form that has distinct disadvantages. The present invention overcomes these disadvantages.

2. Sulfur donors

U.S. Patent No. 4,621,118 to Schloman

U.S. Patent No. 2,989,513 to Hendry

U.S. Patent No. 2,481,140 to Morris

All of these patents teach a chemical reaction of sulfur with an organic compound to form sulfur donors. The crosslinking achieved using sulfur donors is distinctly different from that achieved using elemental sulfur. No long chain polymers of sulfur are contemplated or achieved. Therefore they are not pertinent.

3. Solutions of normal sulfur

U.S. Patent No. 1,782,693 to Miller

This patent teaches solutions of normal sulfur in an organic resin. Long chain polymers of sulfur do not go into solution in any known substance. Hence it fails to teach or suggest anything concerning polymeric sulfur.

Recently an "improved product" has been introduced, that has a reported average particle size of 2 microns. The improvement is in the degree of dispersion afforded by the smaller particle size. However, as could be expected, the dusting problem has gotten worse with the "improved product", and the dispersion is, of course, still limited by the particle size. There is still a need for much better dispersion than is achieved by the "improved product", or that can be achieved by any product that must rely on the size of a particulate to maximize its dispersion.

It is generally known that rapidly cooling molten sulfur from a sufficiently high temperature produces a mass of polymeric sulfur that is in a rubbery state. This rubbery state is a metastable condition, and upon standing, the mass becomes hard and brittle. It can then be ground to form a powder. In some processes the molten sulfur is sprayed and thereby cooled, the individual droplets formed in the spraying are also initially rubbery. Special handling is necessary to keep them as individual particles since the rubbery state tends to make them agglomerate. In other processes, sulfur vapor is forced under pressure into a liquid cooling medium. Again rubbery particles are first formed. This rubbery state has been considered undesirable because it is a free flowing powder which has been desired.

Other elements in Group $VI_B$ of the Periodic Table of the Elements, notably Selenium and Tellurium, have many properties that are similar to Sulfur. They have found limited use as vulcanizing agents for rubber, and they polymerize. It is well known that they polymerize themselves and that they form copolymers and terpolymers with sulfur. These polymers exhibit rubbery properties similar to those of the monopolymer of sulfur, and hence can be dispersed in similar fashions as the rubbery polymer of sulfur.

Other elements, such as Arsenic, can be included in the sulfur polymer chain, and a rubbery state can still be obtained. One skilled in the art could develop many such modifications of the sulfur polymer, and still obtain a rubbery polymer. These modifications are included in the substance of this invention. The term "polymeric sulfur," as used herein, includes all of the modifications of the polymer that can be obtained in the rubbery state.

There is a need for ways to achieve superior dispersion of polymeric sulfur in rubber in a dust free manner. This need exists whether the sulfur is added to a rubber batch in the lower amounts needed for proper vulcanization, or in the higher amounts used in preparing masterbatches or intermediate batches, which are later added in the proportion needed to achieve the proper quantity of sulfur needed for vulcanization.

SUMMARY OF THE INVENTION

It is an object of the present invention to disclose how to achieve superior dispersions of polymeric sulfur in unvulcanized rubber, in a completely dust free manner.

It is a further object of the present invention to disclose novel blends made of polymeric sulfur with a diluent which is compatible with sulfur vulcanizable polymers.

It is a further object to disclose a novel dust-free method of preparing such blends.

I have discovered that superior dispersion of polymeric sulfur is attained if the polymeric sulfur is added to the rubber while the polymeric sulfur is in the metastable rubbery state. Previous to the present invention, this state has always been regarded as undesirable. The literature contains many descriptions of ways to harden this rubbery mass, so as to make it usable by prior known art.

I have further discovered that superior preparations of polymeric sulfur can be prepared by a method which comprises mixing polymeric sulfur while in the rubbery state with a compatible diluent, which is compatible with the polymer to be vulcanized. The amount of polymeric sulfur in the blend can vary from about 2% to about 95% by weight of the total blend. However, the preferred blends will contain about 20% to about 95% of the rubbery polymeric sulfur by weight.

Electron Micrographs of a cross section of this superior dispersion, taken by a Leica Cambridge Ltd. S360 Scanning Electron Microscope, Version V0302A, equipped with Dynamic Stereo and Remote Control options, failed to discern any areas of unblended polymeric sulfur. The same device clearly discerned the <1 micron to 3 micron particulates of Crystex Sulfur, the brand of insoluble sulfur that presently dominates the market because it is the best available, in a 50/50 masterbatch dispersion of Crystex/EPR 707 (a high Mooney Viscosity Ethylene Propylene Rubber). These micrographs also showed the non-uniform dispersion of the sulfur particulates, and showed three-dimensional agglomerates of these particulates up to 29 microns across.

The blends of the present invention, since they are formed with the polymeric sulfur in the rubbery state, eliminate the need for comminution into fine powders, thereby effecting significant economies and eliminating the hazardous formation of dust. It also eliminates the need for the rubbery sulfur polymer to harden, so that it can be processed into a powder, thereby effecting more economies. The blends of the present invention when properly prepared do not harden. They remain in the viscous or rubbery state so as to be readily dispersable by the commercial methods used to mix rubber.

In the preferred practice of the method of the present invention, the conversion process by which soluble sulfur is converted to polymeric sulfur is interrupted when the polymeric sulfur is in the rubbery state, and the rubbery polymeric sulfur is mixed with the unvulcanized rubber, in the proportion needed for proper vulcanization, or with the compatible diluent, at that time.

In another embodiment, a portion of the polymer that is to be vulcanized is mixed or masticated and used as the compatible diluent for the rubbery polymeric sulfur which is blended into it, thereby reducing the number of processing steps even further. A two roll rubber mill or other masticating equipment can be used.

In still another embodiment, normal or rhombic sulfur can be mixed in a relatively high percentage (e.g. 80%) with a compatible diluent, such as EPR (ethylene-propylene rubber, a saturated rubbery polymer) and the sulfur polymerized in situ, by raising the temperature of the mixture to melt the sulfur and then rapidly cooling the mixture. This diluent must be of such nature that it will not chemically react with the sulfur. This process is best done in a chambered mixer, such as an extended barrel extruder rather than on an open mill. When using the preferred high percentage of sulfur, the molten sulfur tends to separate out of the mixture and runs off the mill. In the preferred extruder, the first zone is heated and subsequent zones cooled.

In another preferred embodiment, the sulfur conversion unit is set up convenient to the intensive internal mixer, of the Banbury type. The rubbery sulfur is added to the final or intermediate batch in the quantities needed for proper vulcanization of the intended final batch. A 3 lb. capacity laboratory mixer was used.

If desired, the polymerized molten sulfur can be added directly to the rubber batch being mixed in the Banbury, using the rubber matrix as the rapid cooling medium for the sulfur.

It will be apparent to those skilled in the art that the above objects and other advantages will accompany the practice of the present invention.

DESCRIPTION OF PREFERRED EMBODIMENTS

In the preferred practice of the method of the present invention, polymeric sulfur in the rubbery state is blended with the compatible diluent, which is rubber, by mixing the rubbery polymeric sulfur and the diluent on a two roll rubber mill and continuing the blending or mastication until a uniform blend is obtained. The amount of the rubbery polymeric sulfur which is used is preferably enough to produce a uniform blend which contains about 40% to about 80% of the polymeric sulfur as based on the total weight of the blend.

The rubbery polymeric sulfur can be prepared by any known manner. It is known that at about 113 degrees C. and above, sulfur melts. The molten sulfur begins to polymerize as the temperature is raised to about 159 degrees C. This is evidenced by a pronounced increase in viscosity. As the temperature is further increased, the viscosity increases sharply to a maximum in a rise of only a few degrees. It then drops off at a fairly steady rate as the temperature is still further increased. It is believed that the mean chain length is at its maximum at the point of maximum viscosity, and that the mean chain length decreases as the temperature rises further. The higher viscosities apparently have not been shown to inversely correlate with the percent of unpolymerized sulfur present. The purer the sulfur, the higher is the maximum viscosity. The curve of the viscosity versus temperature of pure sulfur is reversible if the temperature changes are gradual. This reversibility does not necessarily hold true when other substances, such as certain organic compounds or halogens, are present in small amounts. In pure sulfur, the end of the polymer chain is a free radical. When these other substances are present, either purposefully or accidentally, the free radical is probably "capped" by the other substances.

If the molten sulfur is cooled gradually from the temperature of maximum viscosity, the drop in viscosity is attributed to the reversion of the polymeric sulfur to predominantly $S_8$. Other sulfur molecules, notably $S_6$, but others from $S_2$ to $S_{23}$ have been identified.

When the molten sulfur is cooled rapidly from temperatures whereat a significant portion of the sulfur is polymeric, the polymeric form survives to a metastable form, which is rubbery, at room temperature. In pure sulfur, the polymer reverts to predominantly $S_8$ in a relatively short time. This reversion is hindered by the presence of halogens or certain other substances, and seems to be accelerated by the presence of moisture, or alkalinity.

Upon rapid cooling, the molten polymerized sulfur forms a rubbery mass or rubbery polymeric sulfur, which hardens by itself upon standing. This hardening does not necessarily indicate de-polymerization, or reversion. Certain treatments can accelerate this hardening.

The compatible diluent which is blended with the rubbery polymeric sulfur to form the blends of the present invention can be any substance which is compatible with both the rubbery polymeric sulfur and the polymer which is to be vulcanized with the blend. Representative diluents include natural and synthetic rubbers, soaps, petroleum fractions, wood tar products and plasticizers, such as ethers and esters and their polymers.

The method of preparing the blends can be any of those described herein, as well as other methods which can be used to form sufficiently uniform blends.

In the following examples 1 to 6, several techniques are described which demonstrate the wide variety of sulfur conversion processes that can be used in the practice of this invention.

EXAMPLE 1

One part of bromine is added to one hundred parts of sulfur in a glass retort. Heat is applied to melt and then vaporize the sulfur. When the distillate runs in a steady stream, which must be a very thin stream, it is run into a pot of ice water which is rotating at forty-five rpm. It is collected until the stream becomes unsteady, which indicates that it will soon break. The sulfur forms a rubbery mass of strings in the ice water. It is removed from the ice water, and shook to remove most of the water. The remaining water is blown off with compressed air. The rubbery polymeric sulfur is then blended with an equal amount of natural rubber, the compatible diluent, on a two roll mill. An excellent uniform blend of the polymeric sulfur and the rubber is obtained.

EXAMPLE 2

The procedure of Example 1 is repeated except in place of 1 part bromine, 0.8 parts of bromine and 0.2 parts of iodine are used. An excellent uniform blend of the polymeric sulfur and the rubber is obtained.

EXAMPLE 3

The procedure of Example 2 is repeated, but the distillate of polymeric sulfur is run directly into the nip of a cooled two roll rubber mill upon which the rubber, the compatible polymer, has already been banded and has formed a rolling nip. An excellent uniform blend of the polymeric sulfur and the rubber is obtained.

EXAMPLE 4

One hundred parts of sulfur and 0.25 parts of bromine are melted in a beaker and heated to a point (e.g. 200 degrees C.) above the maximum viscosity of the sulfur to form a liquid. The liquid is slowly poured into a rotating ice water bath to form rubbery polymeric sulfur which after isolation is blended with rubber, the compatible diluent, as in Example 1. An excellent uniform blend of the polymeric sulfur and the rubber is obtained.

EXAMPLE 5

The procedure of Example 4 is repeated except that the molten liquid sulfur is fed into the compatible diluent, rubber, in the nip of the rollers, as in Example 3. An excellent uniform blend of the polymeric sulfur and the rubber is obtained.

EXAMPLE 6

One hundred parts of sulfur and one part of iodine are melted in an aluminum dish on a hotplate and heated to spontaneous combustion. The molten sulfur is sprayed with a hot spray gun onto a cool aluminum sheet to form a thin coating of rubbery polymeric sulfur. The coating is peeled from the aluminum sheet, and laminated with a thin sheet of broken down rubber, the compatible diluent. The laminate is rolled up and passed through the nip of a two roll rubber mill. The mixture is cross rolled several times and banded on the mill. An excellent uniform blend of the polymeric sulfur and the rubber is obtained.

EXAMPLE 7

The uniform blends prepared as described in Examples 1–6 can be used as vulcanizing agents for sulfur vulcanizable polymers. The vulcanizing agents can be readily and uniformly dispersed in the polymer to be vulcanized. The resulting products are free of defects caused when sulfur is not uniformly dispersed in the compound.

EXAMPLE 8

|  | parts per 100 RHC | gms. per 3 lb. batch |
| --- | --- | --- |
| 1. NR | 50.0 | 420.0 |
| 2. SBR | 50.0 | 420.0 |
| 3. HAF Carbon Black | 50.0 | 420.0 |
| 4. Process Oil | 3.0 | 25.2 |
| 5. Zinc Oxide | 3.0 | 25.2 |
| 6. Stearic Acid | 2.0 | 16.8 |
| 7. Antioxidant | 1.0 | 8.4 |
| 8. Accelerator | 1.0 | 8.4 |
| 9. Rubbery Sulfur | 2.5 | 21.0 |
| TOTAL | 162.5 pts. | 1365.0 gms. |

If it is desired to initially keep selected ingredients apart, such as the sulfur and accelerator, two or more intermediate batches could be mixed separately, and later blended together, to give the desired finished batch formulation. Typical recipes for accomplishing this would be:

|  | Batch A | Batch B |
| --- | --- | --- |
| 1. NR | 50.0 | 50.0 |
| 2. SBR | 50.0 | 50.0 |
| 3. HAF | 50.0 | 50.0 |
| 4. Process Oil | 3.0 | 3.0 |
| 5. Zinc Oxide | 3.0 | 3.0 |
| 6. Stearic Acid | 2.0 | 2.0 |
| 7. Antioxidant | 1.0 | 1.0 |
| 8. Accelerator | 2.0 | 0.0 |
| 9. Rubbery Sulfur | 0.0 | 5.0 |
| TOTAL | 161.0 | 164.0 |

Batch A and Batch B are each mixed. After cooling, they are blended in proportion to their batch weight to give the same finished batch as in the formula immediately above.

EXAMPLE 9

95 parts of sulfur and 5 parts of Selenium are melted together and heated to 260° C. Upon rapid cooling, a rubbery mass is formed. This is then blended with rubber. An excellent dispersion is obtained.

As previously described, the rubbery polymeric sulfur used to make the blends may be prepared by any known method. However, it also has been found that if rubbery polymeric sulfur is treated, either after it is formed, or as it is formed, with a solvent for soluble sulfur, such as carbon disulfide, a chlorinated hydrocarbon, an aromatic hydrocarbon, or other suitable solvent, it is possible to dissolve out some or substantially all of the soluble sulfur present. As a result, the polymeric sulfur content of the rubbery mass can thereby be increased on a percentage basis. As a result, blends prepared from polymeric sulfur thus treated contain less soluble or normal sulfur.

It will be apparent to those skilled in the art that a number of modifications and changes can be made without departing from the spirit and scope of the invention. Therefore, the invention is not to be limited except by the claims.

I claim:

1. A method of achieving superior dispersions of insoluble sulfur in rubber which comprises blending a member comprising insoluble sulfur with the rubber while the insoluble sulfur is in a metastable, elastic, unhardened state.

2. A method of claim 1 in which the insoluble sulfur is treated with a solvent for soluble sulfur before blending, to reduce the soluble sulfur content.

3. A method of claim 1 in which the member is a polymer comprised entirely of insoluble sulfur except for a small amount of stabilizing halogen.

4. A method of claim 1 in which the member contains in addition to sulfur an element selected from selenium and tellurium.

* * * * *